US012626501B2

(12) United States Patent
Lin et al.

(10) Patent No.: US 12,626,501 B2
(45) Date of Patent: May 12, 2026

(54) METHOD FOR DETECTING DEFECT IN IMAGE AND DEVICE FOR DETECTING DEFECT IN IMAGE

(71) Applicant: HON HAI PRECISION INDUSTRY CO., LTD., New Taipei (TW)

(72) Inventors: Li-Che Lin, Kaohsiung (TW); Yen-Yi Lin, New Taipei (TW); Cheng-Feng Wang, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 419 days.

(21) Appl. No.: 18/223,570

(22) Filed: Jul. 19, 2023

(65) Prior Publication Data

US 2024/0029423 A1      Jan. 25, 2024

(30) Foreign Application Priority Data

Jul. 21, 2022      (CN) .......................... 202210864322.5

(51) Int. Cl.
*G06V 10/98* (2022.01)
*G06V 10/50* (2022.01)
*G06V 10/75* (2022.01)

(52) U.S. Cl.
CPC ............ *G06V 10/993* (2022.01); *G06V 10/50* (2022.01); *G06V 10/751* (2022.01); *G06V 10/758* (2022.01)

(58) Field of Classification Search
CPC .... G06V 10/993; G06V 10/50; G06V 10/751; G06V 10/758; G06V 10/75; G06T 7/0002; G06T 5/40; G06T 2207/30168
See application file for complete search history.

(56) References Cited

U.S. PATENT DOCUMENTS

| | | | | | |
|---|---|---|---|---|---|
| 5,850,466 | A | * | 12/1998 | Schott | G06V 10/7515 |
| | | | | | 382/218 |
| 6,539,106 | B1 | * | 3/2003 | Gallarda | G06V 10/987 |
| | | | | | 382/286 |
| 6,714,689 | B1 | * | 3/2004 | Yano | G06T 3/4038 |
| | | | | | 382/284 |
| 7,970,201 | B2 | * | 6/2011 | Ben-Yishay | G06V 10/757 |
| | | | | | 382/274 |
| 8,326,079 | B2 | * | 12/2012 | Vans | G06V 10/993 |
| | | | | | 382/275 |
| 2004/0066962 | A1 | * | 4/2004 | Sasa | G06T 7/0002 |
| | | | | | 382/141 |

(Continued)

FOREIGN PATENT DOCUMENTS

CN          101464418 B          5/2013

*Primary Examiner* — Aaron W Carter
(74) *Attorney, Agent, or Firm* — ScienBiziP, P.C.

(57)          ABSTRACT

A method for detecting defect in image is provided. The method obtains a number of original images, determines a first reference image from the original images, and performs a histogram matching on the original images excluding the first reference image according to the first reference image, to obtain a plurality of matched images. The method further generates a synthesized image according to pixel intensities of the matched images and pixel intensities of the first reference image; and uses the synthesized image as a second reference image to perform an image comparison with a test image, to generate a result of defect detection. A related device and a related non-transitory storage medium are also provided.

17 Claims, 9 Drawing Sheets

(56) References Cited

U.S. PATENT DOCUMENTS

| | | | |
|---|---|---|---|
| 2008/0013837 A1* | 1/2008 | Porter | G06V 40/165 |
| | | | 382/218 |
| 2011/0090372 A1* | 4/2011 | Doida | H04N 23/76 |
| | | | 382/284 |
| 2011/0102578 A1* | 5/2011 | Kaminaga | H04N 23/741 |
| | | | 348/135 |
| 2011/0228295 A1* | 9/2011 | Doida | H04N 23/70 |
| | | | 358/1.9 |
| 2011/0255774 A1* | 10/2011 | Ben-Yishay | G06V 10/757 |
| | | | 382/149 |
| 2011/0274371 A1* | 11/2011 | Hsieh | G06T 3/4007 |
| | | | 382/300 |
| 2012/0026316 A1* | 2/2012 | Nagahama | G06T 7/001 |
| | | | 382/152 |
| 2012/0229618 A1* | 9/2012 | Urano | G06T 7/0004 |
| | | | 348/92 |
| 2013/0148882 A1* | 6/2013 | Lee | G06V 10/255 |
| | | | 382/164 |
| 2013/0222645 A1* | 8/2013 | Bilcu | H04N 19/154 |
| | | | 382/233 |
| 2014/0300911 A1* | 10/2014 | Shiffman | H04N 1/00015 |
| | | | 358/1.9 |
| 2015/0221073 A1* | 8/2015 | Matsuyama | G06T 5/70 |
| | | | 382/167 |
| 2015/0221076 A1* | 8/2015 | Gao | G06T 7/001 |
| | | | 382/149 |
| 2016/0189369 A1* | 6/2016 | Jung | G02B 21/0056 |
| | | | 382/149 |
| 2017/0140516 A1* | 5/2017 | Maher | G06V 10/758 |
| 2017/0169552 A1* | 6/2017 | Brauer | G06T 7/001 |
| 2017/0186144 A1* | 6/2017 | Chien | G06T 7/0008 |
| 2018/0131815 A1* | 5/2018 | Spivakovsky | H04N 1/00015 |
| 2018/0218492 A1* | 8/2018 | Zhang | G06T 7/0006 |
| 2018/0266968 A1* | 9/2018 | Hirai | G06T 7/001 |
| 2022/0405905 A1* | 12/2022 | Doi | G01N 21/9505 |
| 2023/0098730 A1* | 3/2023 | Gu | G06F 16/50 |
| | | | 382/149 |
| 2024/0029423 A1* | 1/2024 | Lin | G06V 10/993 |
| 2025/0216835 A1* | 7/2025 | Seguias-Bandry | |
| | | | G05B 19/4155 |

* cited by examiner

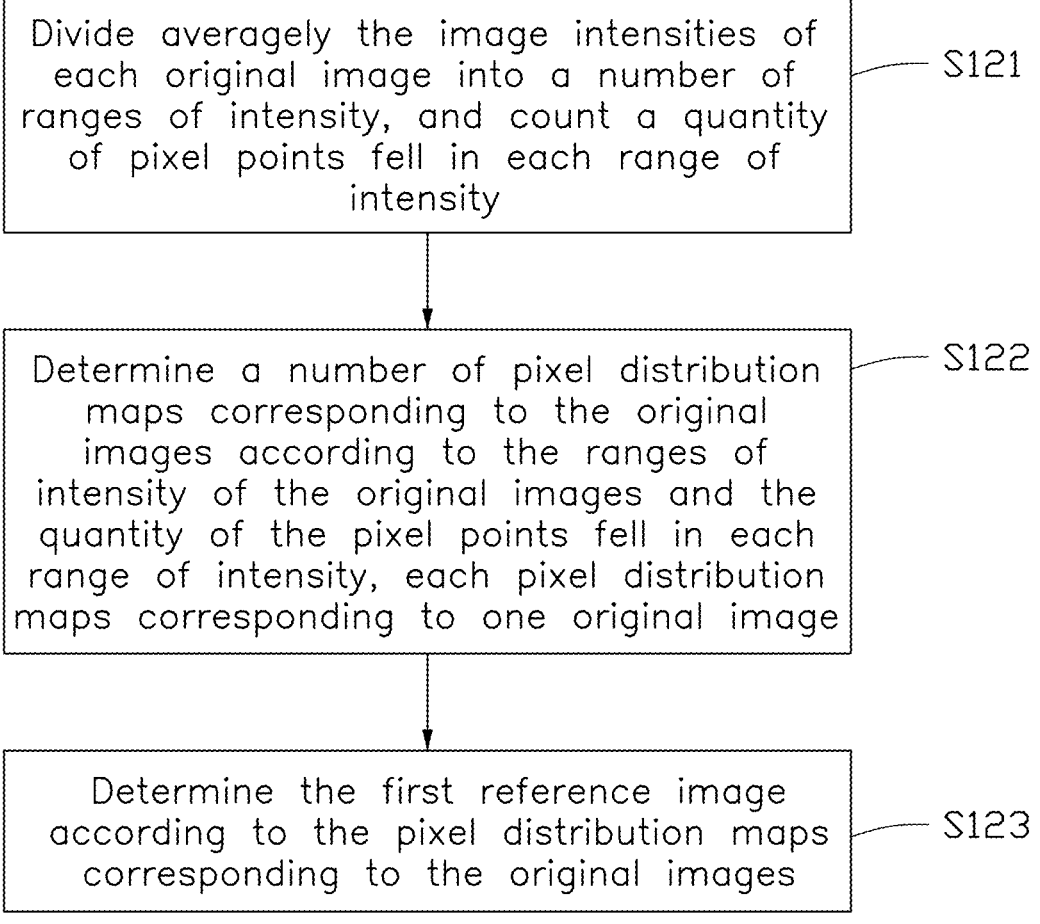

Divide averagely the image intensities of each original image into a number of ranges of intensity, and count a quantity of pixel points fell in each range of intensity — S121

Determine a number of pixel distribution maps corresponding to the original images according to the ranges of intensity of the original images and the quantity of the pixel points fell in each range of intensity, each pixel distribution maps corresponding to one original image — S122

Determine the first reference image according to the pixel distribution maps corresponding to the original images — S123

METHOD FOR DETECTING DEFECT IN IMAGE AND DEVICE FOR DETECTING DEFECT IN IMAGE

FIELD

The subject matter herein generally relates to defect detection technology, and particularly to a method for detecting defect in image and a device for detecting defect in image.

BACKGROUND

To detect defect in an image, a histogram equalization method is employed to reduce a gray level difference among a number of original images, and then a median filter is employed to generate a synthesized image. A following detection processing for defect can be then performed. If sources for the original images are different, a problem of variations in the light source, the contrast, and the color among the original images may appear, where different sources, for example, can be different capturing environments, different cameras, and different parameters of the camera. Thus, pixel distributions among the processed original images cannot be guaranteed to be similar and the pixel distributions at a single position may not meet the assumption of normality. When the median filter generates the synthesized image, defects in some original images may be doped into the synthesized image, thus a reference value of the synthesized image is lower and an efficiency of an image comparison is lower.

SUMMARY

An embodiment of the present application provides a method for detecting defect in image and a device for detecting defect in image which can improve an image comparison efficiency.

In a first aspect, an embodiment of the present application provides a method for detecting defect in image. The method includes obtaining a number of original images, and determining a first reference image from the original images. The method further includes performing a histogram matching on the original images excluding the first reference image according to the first reference image, to obtain a number of matched images. The method includes generating a synthesized image according to pixel intensities of the matched images and pixel intensities of the first reference image. The method further includes using the synthesized image as a second reference image to perform an image comparison with a test image, to generate a result of defect detection.

According to some embodiments of the present application, after obtaining a number of original images, the method further includes obtaining pixel distribution information of each original image. Where the pixel distribution information including a distribution of pixel points and a number of pixel intensities corresponding to the pixel points. Each pixel intensity corresponds to one pixel point.

According to some embodiments of the present application, determining a first reference image from the original images includes dividing averagely the image intensities of each original image into a number of ranges of intensity; counting a quantity of pixel points fell in each range of intensity; determining a number of pixel distribution maps corresponding to the original images according to the ranges of intensity of the original images and the quantity of the pixel points fell in each range of intensity; each pixel distribution map corresponding to one original image; and determining the first reference image to be an image corresponding to one pixel distribution map which is a most standard normal distribution among the pixel distribution maps.

According to some embodiments of the present application, before generating the synthesized image according to image intensities of the matched images, the method further includes overlapping the matched images and the first reference image to generate a number of overlapping images. Each overlapping image includes a number of pixel points.

According to some embodiments of the present application, the overlapping the matched images and the first reference image to generate a number of overlapping images includes aligning each matched image with the first reference image, and generating the overlapping images which are overlapped areas among the aligned matched images and first reference image.

According to some embodiments of the present application, generating a synthesized image according to image intensities of the matched images includes, for each of the pixel points in one overlapping image, determining a median in a number of pixel intensities at a same pixel point of the overlapping images, and generating the synthesized image according to the median corresponding to each of the pixel points.

According to some embodiments of the present application, after generating the synthesized image according to image intensities of the matched images, the method further includes performing a gaussian blur processing on the test image, and using the synthesized image as the second reference image to perform the image comparison with the test image after the Gaussian blur processing to generate the result of the defect detection.

According to some embodiments of the present application, using the synthesized image as a second reference image to perform the image comparison with the test image, to generate the result of defect detection includes generating the result of the defect detection according to a result of a luminance comparison, a result of a contrast comparison, and a result of a structure comparison between the synthesized image and the test image.

According to some embodiments of the present application, using the synthesized image as the second reference image to perform the image comparison with the test image, to generate the result of defect detection includes using the synthesized image as the second reference image, partitioning the second reference image and the test image to generate a number of image blocks, and performing the image comparison between each image block of the test image and a corresponding image block of the second reference image, and determining one image block of the test image to be a defect block and remark the defect in the defect block if a result of the image comparison between the one image block of the test image and one corresponding image block of the second reference image is greater than a preset threshold.

In a second aspect, an embodiment of the present application provides a device for detecting defect in image. The device includes a storage device, and at least one processor. The storage device stores one or more programs, which when executed by the at least one processor, cause the at least one processor to: obtain a number of original images; determine a first reference image from the original images; perform a histogram matching on the original images excluding the first reference image according to the first reference image, to obtain a number of matched images;

generate a synthesized image according to pixel intensities of the matched images and pixel intensities of the first reference image; use the synthesized image as a second reference image to perform an image comparison with a test image, to generate a result of defect detection.

Comparing to a nowadays technology, the disclosure has the following beneficial effects:

In the disclosure, the pixel distributions of the original images excluding the first reference image is adjusted to be similar to the first reference image, and the hue of the original images excluding the first reference image is adjusted to be similar to the hue of the first reference image. Thus, the residual defects in the synthesized image may be reduced, the reference value of the synthesized image can be improved, and the image comparison efficiency can be improved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 2 is a flowchart of an embodiment illustrating and describing a process for determining a first reference image from a number of original images.

DETAILED DESCRIPTION

In order to more clearly understand the above objects, features and advantages of the present application, the following detailed description of present application will be made with reference to the accompanying drawings and specific implementations. It should be noted that implementations and characteristics thereof in the present application can be combined mutually in the case of no conflict. Many specific details are described in the following description to fully understand the present application, but described implementations are merely a portion of implementations of present invention, rather than all of the implementations.

Unless otherwise defined, all technical and scientific terms used herein have the same meaning as commonly understood by one ordinarily skilled in the art to which the present disclosure pertains. In the present disclosure, the terms used in the description is for the purpose of describing the specific embodiments, but not intended to limit the present disclosure. As used herein, the term "and/or," includes any and all combinations of one or more of the associated listed items.

Figure 1:
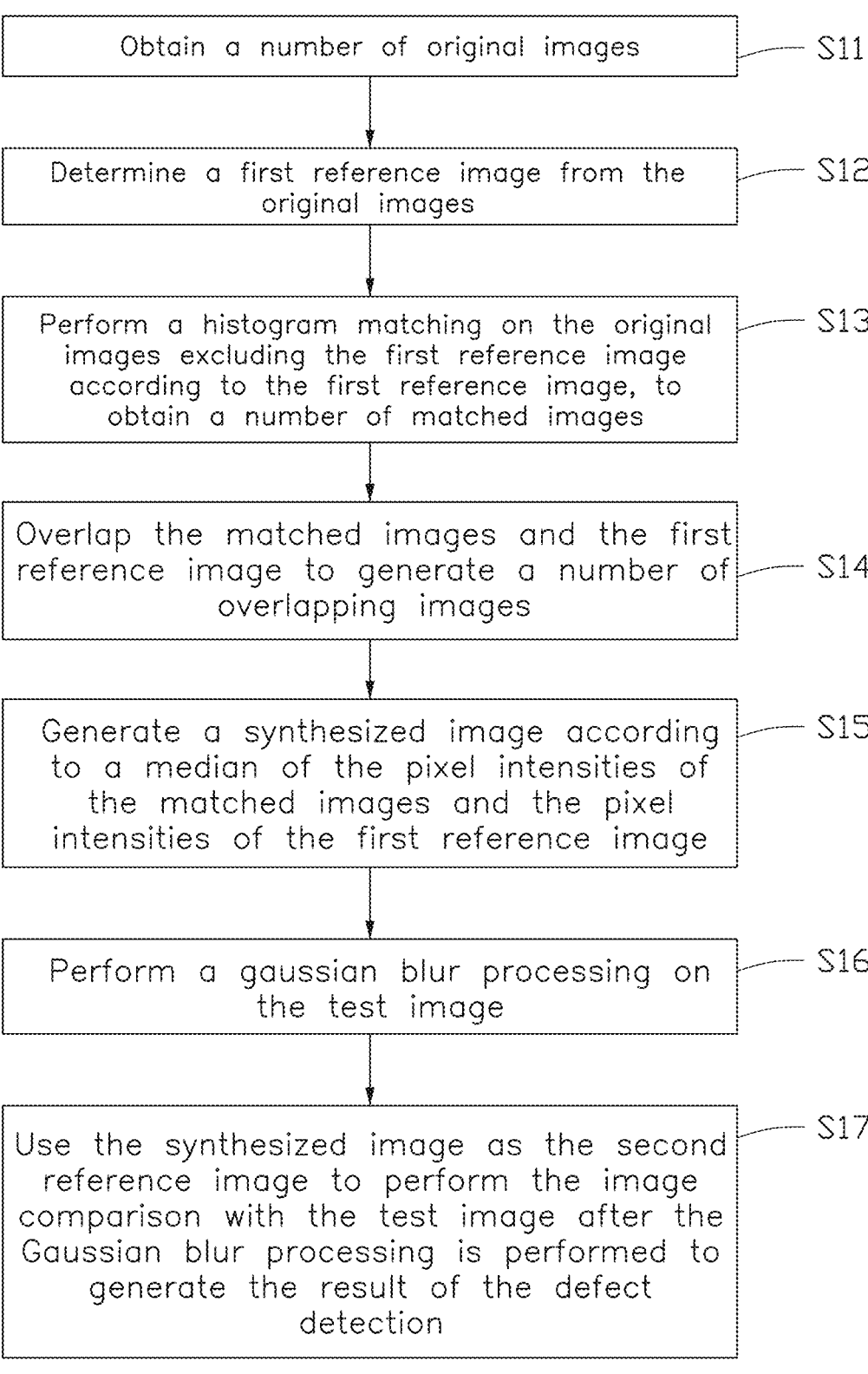
FIG. 1 is a flowchart of an embodiment of a method for detecting defect in image.

Referring to FIG. 1, a method for detecting defect in image is shown. The method can include:

Step S11, obtaining a number of original images.

In some embodiments, the step S11 further includes obtaining pixel distribution information of each original image. Where the pixel distribution information includes a distribution of pixel points and a number of pixel intensities corresponding to the pixel points. Each pixel intensity corresponds to one pixel point.

In some embodiments, the original images each can be an image of a portion of the wafer captured by an image capturing unit. In different original images, the wafers may be different. The image capturing unit, for example, can be an industrial camera. The pixel distribution information of the original images can be obtained via any known acquisition technology for pixel of the image, the disclosure is not limited herein.

It can be understood that, the image obtaining unit capture images of the wafers at a fixed portion of the wafers, and there may be one or more image capturing units. Due to a difference of capturing environments, a difference of the image capturing units, or the like, a problem of variations in the light source, the contract, and the color among the captured original images may be existed. Thus, the pixel distribution information of the original images may be different.

Step S12, determining a first reference image from the original images.

Referring also to FIG. 2, the step S12 further includes:

Step S121, dividing averagely the image intensities of each original image into a number of ranges of intensity, and counting a quantity of pixel points fell in each range of intensity.

In some embodiments, each pixel intensity can be in a range from 0 to 255, for example each range of intensity includes eight successive pixel intensities, and there is thirty-two ranges of intensity in each original image.

It can be understood, in some embodiments, each original image can be a color image. In RGB color space, each original image includes pixel intensities in a red channel, pixel intensities in a green channel, and pixel intensities in a blue channel, the disclosure is not limited herein.

Step S122, determining a number of pixel distribution maps corresponding to the original images according to the ranges of intensity of the original images and the quantity of the pixel points fell in each range of intensity. Each pixel distribution maps corresponding to one original image.

Step S123, determining the first reference image according to the pixel distribution maps corresponding to the original images.

In some embodiments, the first reference image can be an image corresponding to one pixel distribution map which is a most standard normal distribution among the pixel distribution maps. It can be understood that, the first reference image can be manually selected according to the form of the pixel distribution maps; the first reference image can be selected via a normal distribution test according to the quantity of the pixel points to determine a pixel distribution map which is a most standard normal distribution among the pixel distribution maps.

Step S13, performing a histogram matching on the original images excluding the first reference image according to the first reference image, to obtain a number of matched images.

In some embodiments, performing the histogram matching on the original images excluding the first reference image according to the first reference image includes a step a1. The step a1 includes adjusting the pixel distributions of the original images excluding the first reference image according to the pixel distribution map of the first reference image, to cause the pixel distribution of each original image excluding the first reference image to be similar to the pixel distribution of the first reference image.

Figure 3:
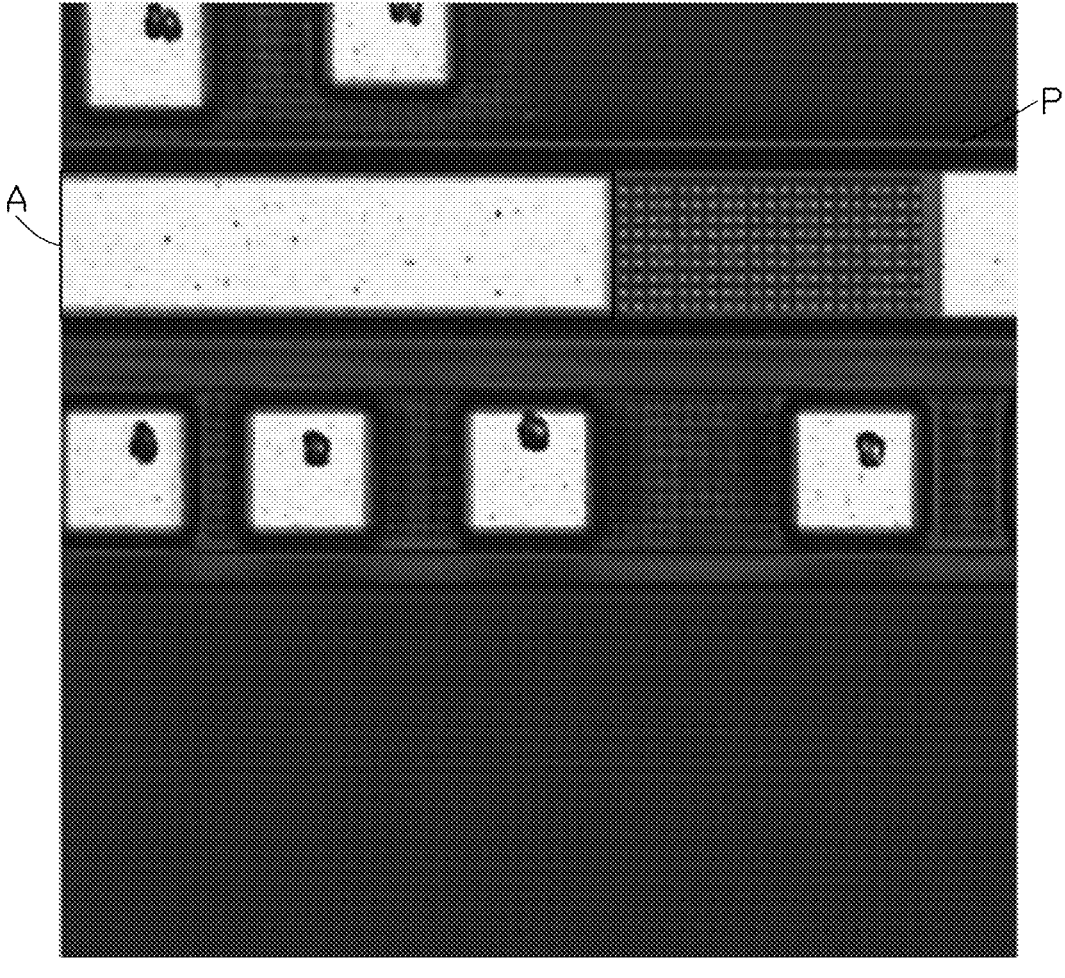
FIG. 3 is a view of an embodiment of a first reference image.
Figure 4:
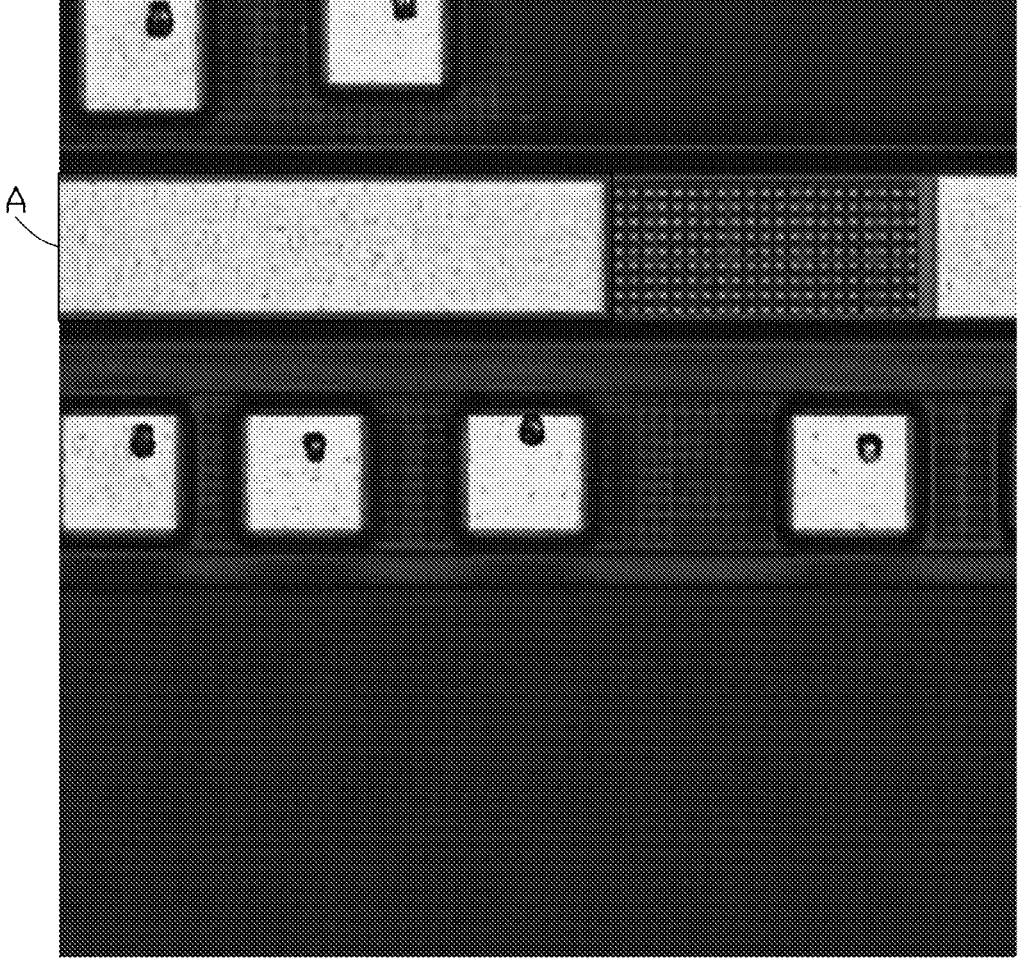
FIG. 4 is a view of an embodiment of one of the original images excluding the first reference image.
Figure 5:
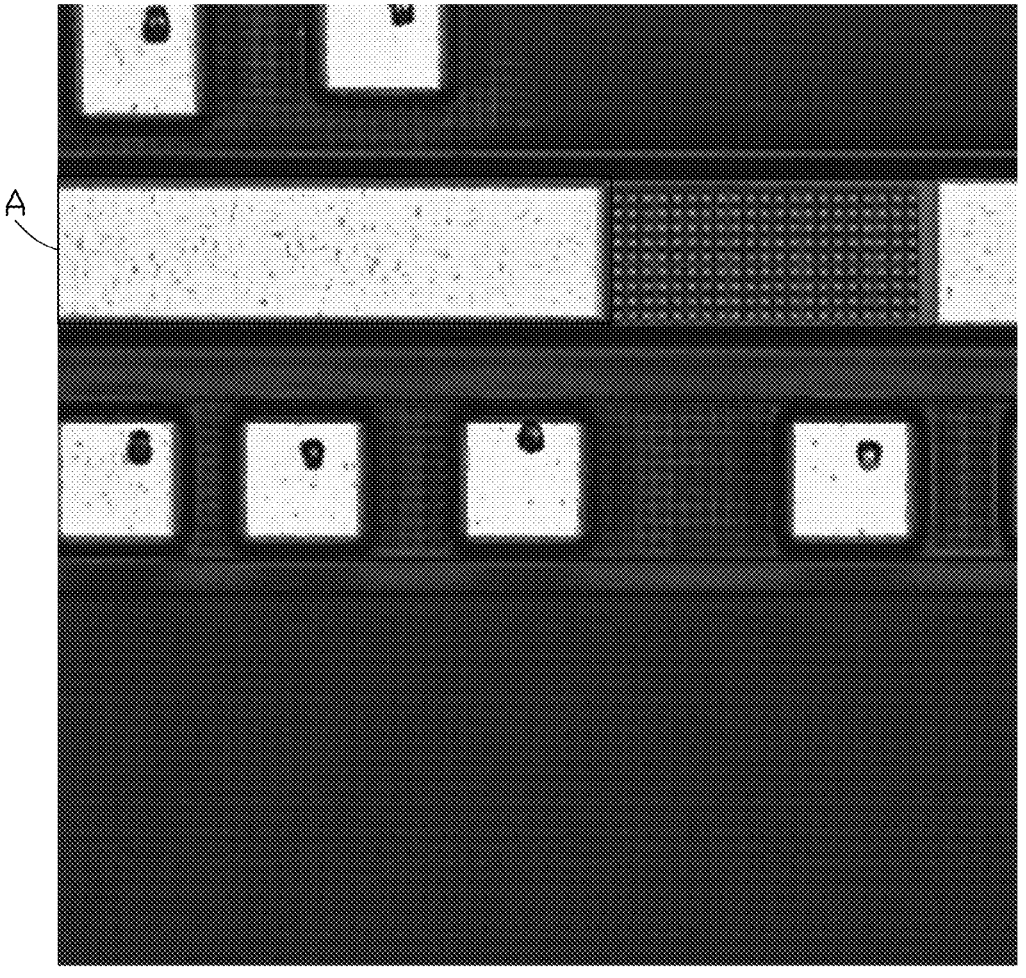
FIG. 5 is a view of an embodiment of an image after the histogram matching is performed.

Referring also to FIGS. 3-5, FIG. 3 is a view of an embodiment of a first reference image, FIG. 4 is a view of an embodiment of one of the original images excluding the first reference image, and FIG. 5 is a view of an embodiment of an image after the histogram matching is performed.

It can be understood that, FIG. 4 and FIG. 5 are respectively the original image before the histogram matching is performed and the original image after the histogram matching is performed. From the FIGS. 3-5, we can see that, a number of defects are existed in the original image as shown in the FIG. 4. After the histogram matching is performed, comparing with the area of the original image labeled by A shown in the FIG. 4, the defects in the area of the original image labeled by A shown in the FIG. 5 are reduced. The defect may be scratch caused during a processing of the wafer, a minute dust in an environment dropping onto the wafer, or the like.

It can be understood that, the pixel distributions of the original images excluding the first reference image are adjusted to be similar to the first reference image, and the hues of the original images excluding the first reference image are adjusted to be similar to the hue of the first reference image. Thus, the residual defects in the synthesized image may be reduced, the reference value of the synthesized image can be improved, and the image comparison efficiency can be improved.

Step S14, overlapping the matched images and the first reference image to generate a number of overlapping images.

In some embodiments, the overlapping the matched images and the first reference image to generate a number of overlapping images includes a step b1 and a step b2.

The step b1 includes aligning each matched image with the first reference image. In some embodiment, the method moves and rotates each matched image in two-dimensional direction in a plane in parallel to the first reference image, to align the matched images with the first reference image at one or more characteristics which appear in all the original images, for example, a line labeled by P shown in the FIG. 3. Thus, after aligning, the line in each matched image is parallel with and overlaps the line in the first reference image.

The step b2 includes generating the overlapping images which are overlapped areas among the aligned matched images and first reference image. Each overlapping image includes a number of pixel points. Before overlapping, there are a number of original images, and during overlapping, each original image is processed to be an overlapped area. It can be understood that, in one matched image, there may be one or more areas which are not existed in the other matched images or the first reference image, and the one or more areas are not the overlapped areas.

It can be understood that, a displacement deviation may be existed between the element in the first reference image and the element in at least one matched image. The displacement deviation is generated by a positioning error in arrangement of the wafer. The disclosure overlaps the matched images and the first reference image by aligning the matched images and the first reference image, and cutting out the overlapped areas among the aligned matched images and first reference image, thus the displacement deviation can be eliminated.

It can be understood that, the number of overlapping images is the same as a total number of the first reference image and the matched images.

Step S15, generating a synthesized image according to a median of the pixel intensities of the matched images and the pixel intensities of the first reference image.

In detail, in some embodiments, for each of the pixel points in one overlapping image, determining a median in a number of pixel intensities at a same pixel point of the overlapping images, and generating the synthesized image according to the median corresponding to each of the pixel points.

Figure 6:
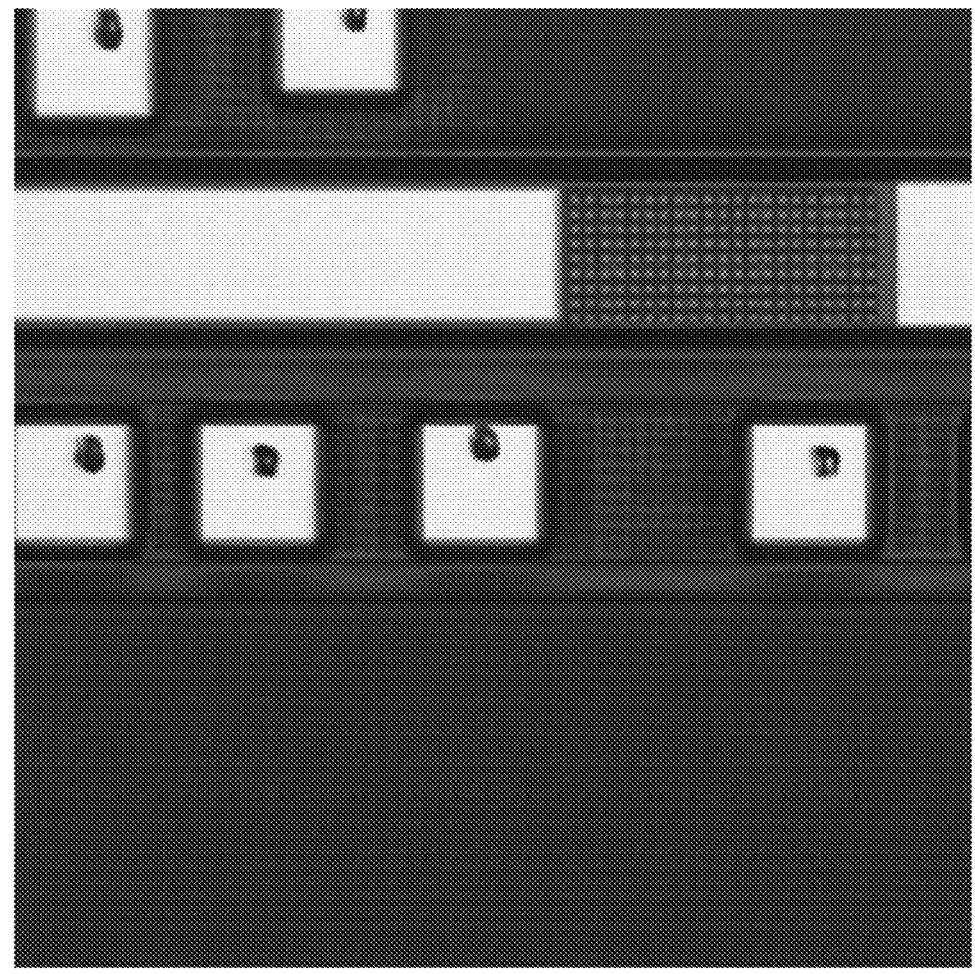
FIG. 6 is a view of an embodiment of a synthesized image.

Referring to FIG. 6, a synthesized image is shown. Obviously, the synthesized image shown in the FIG. 6 combines the first reference image and the matched images, and the matched images are the images after the histogram matching is performed, thus comparing with the images before the histogram matching is performed, the defects in the matched images are reduced, and accordingly the defects in the synthesized image are reduced. Thus, the synthesized image can be a reference image for detecting defect. The disclosure further generates the synthesized image according to the median in the pixel intensities corresponding to each of the pixel points, thus the problem of variations in the light source, the contrast, and the color among the original images can be reduced, a steady of the synthesized result can be improved, and a required number of the original images can be reduced.

Step S16, performing a gaussian blur processing on the test image.

It can be understood that, the test image is the image needed to be detected for defect. The test image can be one original image or the first reference image, or the other image captured by the image capturing unit, the disclosure is not limited herein.

Figure 7:
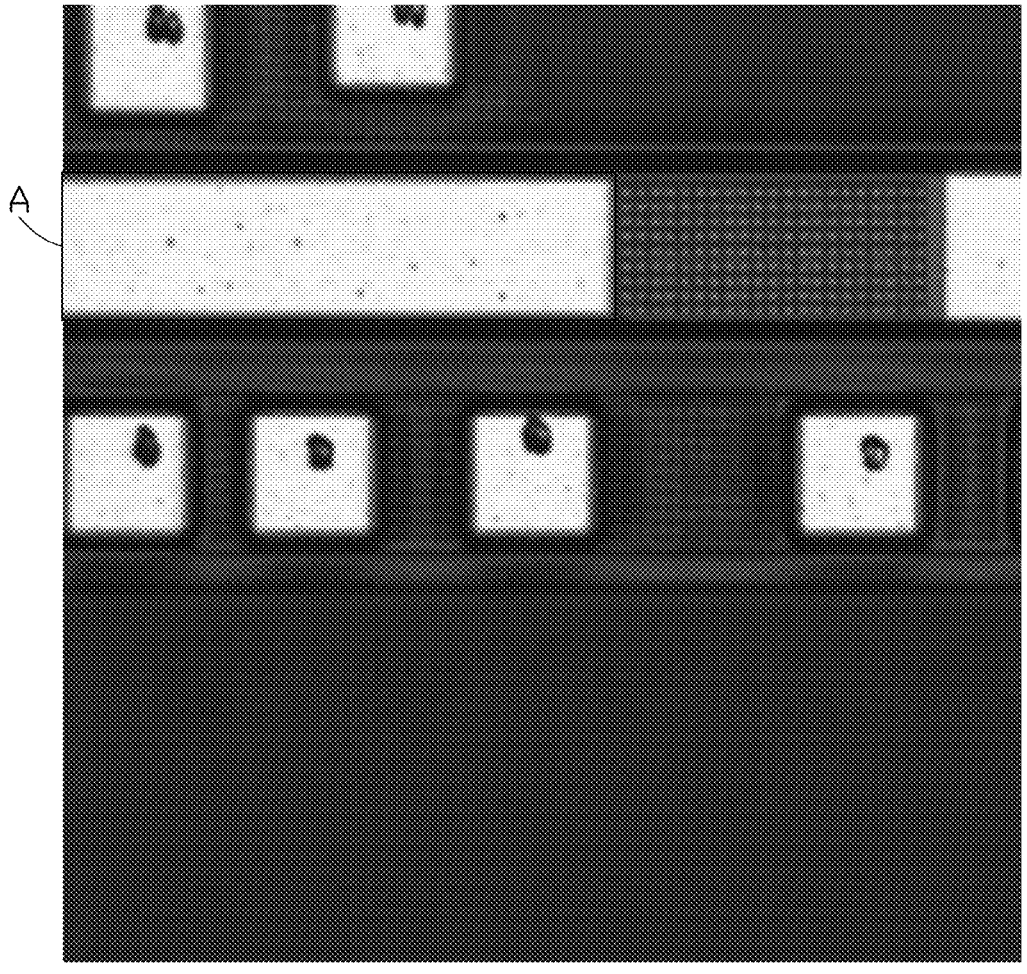
FIG. 7 is a view of an embodiment of a test image after a gaussian blur processing.

Referring to the FIG. 3 and FIG. 7, the FIG. 3 and the FIG. 7 are respectively a test image before the gaussian blur processing is performed and a test image after the gaussian blur processing is performed. It can be understood that, the aim of the gaussian blur processing is to smooth the image and reduce image noise, thus the noise during the image comparison can be reduced. Comparing with the area of the first reference image labeled by A shown in the FIG. 3, the defect in the area of the image labeled by A shown in the FIG. 7 is blurred. Thus, an erroneously detected of a defect during the image comparison can be avoided.

Step S17, using the synthesized image as the second reference image to perform the image comparison with the test image after the Gaussian blur processing is performed to generate the result of the defect detection.

Figure 8:
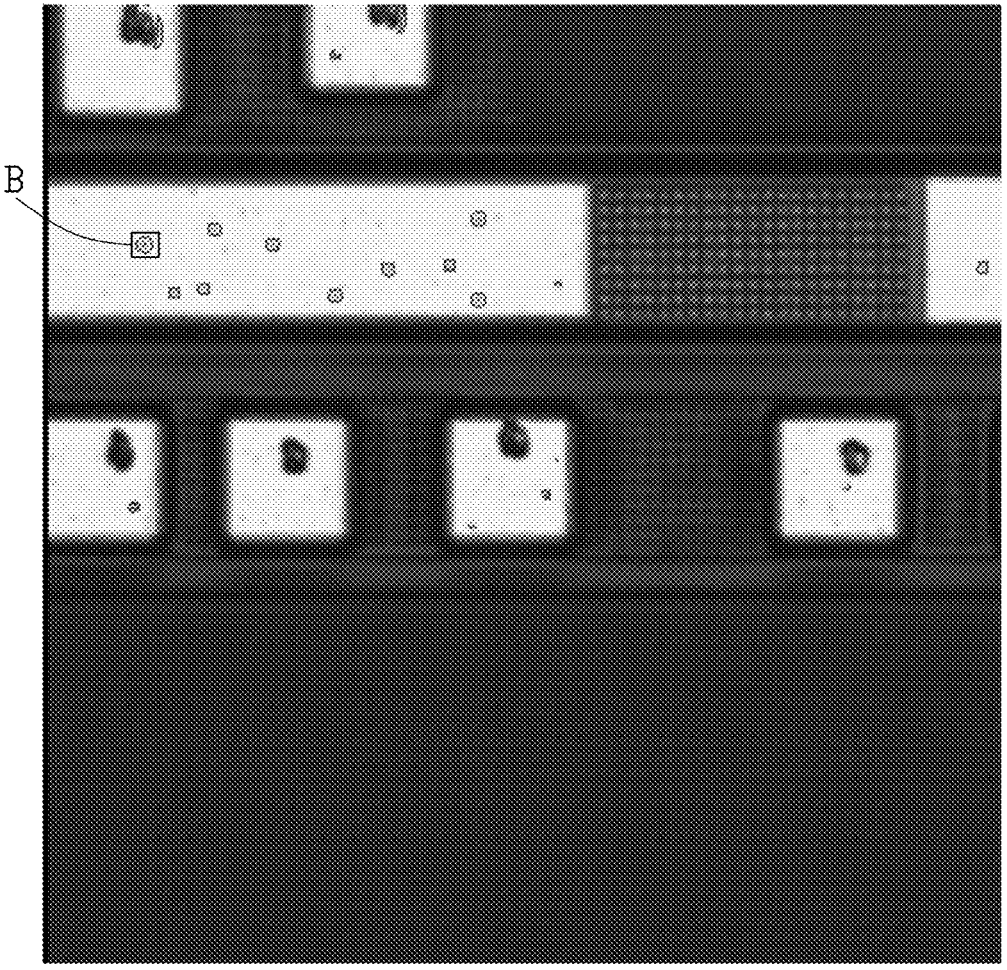
FIG. 8 is a view of an embodiment of a result of a defect detection.

In some embodiments, the result of the defect detection can be a remark of the defect in the test image. For example, referring to FIG. 8, a result of the defect detection is shown. The defect detected by the image comparison with the second reference image is remarked, for example a defect labelled by B as shown in the FIG. 8.

It can be understood that, there are a number of method to perform the image comparison. In some embodiments, a structural similarity index measure method is employed to perform the image comparison. Namely, the method performs a luminance comparison, a contrast comparison, and a structure comparison between the synthesized image and the test image after the Gaussian blur processing is performed. The method further generates the result of the defect detection according to a result of the luminance comparison, a result of the contrast comparison, and a result of the structure comparison between the synthesized image and the test image after the Gaussian blur processing is performed.

It can be understood that, the result of the defect detection can include a position information of the defect detected by comparing the test image after the Gaussian blur processing is performed and the second reference image. In detail, the method includes a step c1, a step c2, a step c3, and a step c4. The step c1 includes using the synthesized image as the second reference image. The step c2 includes partitioning the second reference image and the test image to generate a number of image blocks. The step c3 includes performing the image comparison between each image block of the test image and a corresponding image block of the second reference image. The step c4 includes determining one image block of the test image to be a defect block and remark the defect in the defect block if a result of the image comparison between the one image blocks of the test image and one corresponding image block of the second reference image is greater than a preset threshold.

Figure 9:
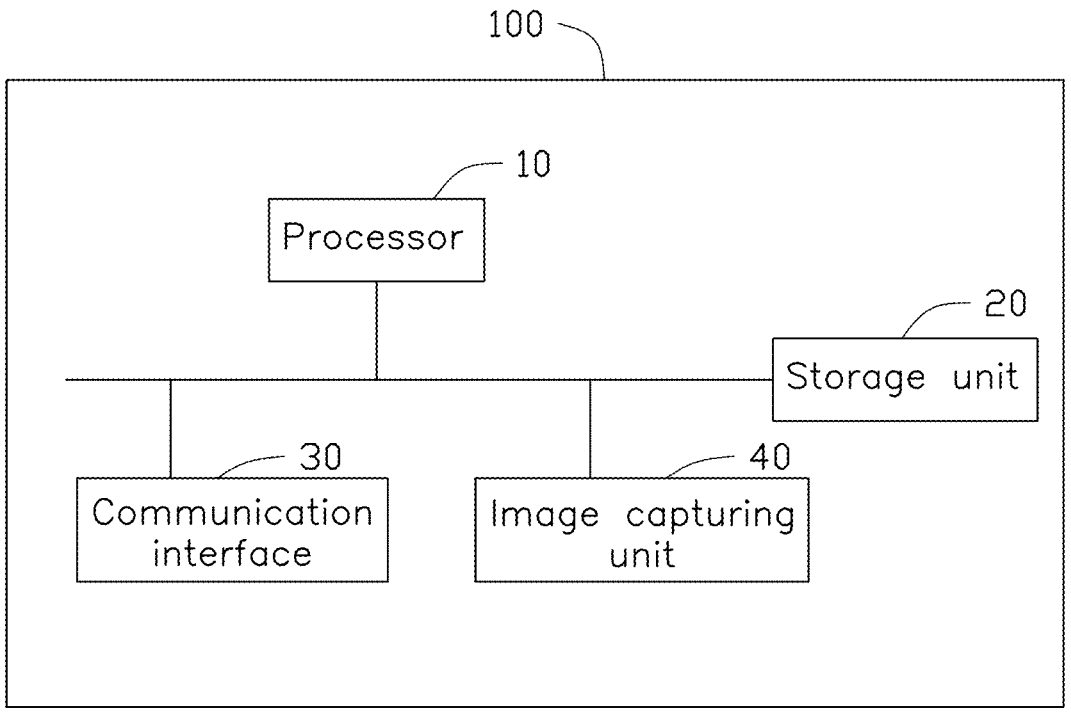
FIG. 9 is a view of an embodiment of a device for detecting defect in image.

Referring to FIG. 9, a device for detecting defect in image 100 is shown. The device for detecting defect 100 includes a processor 10, a storage unit 20, a communication interface 30, and an image capturing unit 40.

The processor 10, the storage unit 20, the communication interface 30, and the image capturing unit 40 are connected by using the communications bus to implement mutual communication.

The processor 10 may be a general purpose central processing unit (CPU), a microprocessor, an application-specific integrated circuit (ASIC), or one or more integrated circuits configured to control program execution in the foregoing solution.

The storage unit 20 may be a read-only memory (ROM) or another type of static storage device that can store static information and a static instruction, or a random access memory (RAM) or another type of dynamic storage device that can store information and an instruction, or may be an electrically erasable programmable ROM (EEPROM), a compact disc ROM (CD-ROM) or another compact disc storage medium, optical disc storage medium (including a compact disc, a laser disc, an optical disc, a digital versatile disc (DVD), a BLU-RAY DISC, or the like) and magnetic disk storage medium, another magnetic storage device, or any other medium that can be configured to carry or store expected program code in a form of an instruction or a data structure and that is accessible to a computer, but is not limited thereto. The memory may independently exist and be connected to the processor 10 using the bus. Alternatively, the memory may be integrated with the processor 10.

The communications interface 30 is configured to communicate with another device or a communications network such as the Ethernet, a RAN, or a WLAN.

The image capturing unit 40 is configured to capture images. The image capturing unit 40 can be an industrial camera, an electronic device having an image capturing function, or the like.

The storage unit 20 is configured to store application program code for executing the foregoing solution, and the execution is controlled by the processor 10. The processor 10 is configured to execute the application program code stored in the storage unit 20. The code stored in the storage unit 20 may be used to perform the foregoing method for detecting defect in image that is shown in FIG. 1 and FIG. 2.

In the disclosure, the pixel distributions of the original images excluding the first reference image is adjusted to be similar to the first reference image, and the hue of the original images excluding the first reference image is adjusted to be similar to the first reference image. Thus, the residual defects in the synthesized image may be reduced, the reference value of the synthesized image can be improved, and the image comparison efficiency can be improved.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method of detecting defect in image comprising:
obtaining a plurality of original images;
selecting one of the plurality of original images as a first reference image, and serving the plurality of original images without the first reference image as the other images;
matching a histogram of each of the other images with a histogram of the first reference image according to the first reference image, to obtain a plurality of matched images;
overlapping the plurality of matched images and the first reference image to generate a plurality of overlapping images, each of the plurality of overlapping images comprising a plurality of pixel points;
generating a synthesized image according to pixel intensities of the plurality of overlapping image; and
using the synthesized image as a second reference image to perform an image comparison with a test image, to generate a result of defect detection;
wherein the generating the synthesized image according to pixel intensities of the plurality of overlapping images comprises:
for each of the plurality of pixel points in an overlapping image of the plurality of overlapping images, determining a median pixel intensity of a plurality of pixel intensities at a same pixel point of the plurality of overlapping images; and
generating the synthesized image according to the median pixel intensity corresponding to each of the plurality of pixel points;
wherein the histogram of each of the plurality of matched images is adjusted based on a degree of similarity between the histogram of each of the other images and the histogram of the first reference image.

2. The method according to claim 1, wherein:
before the determining the first reference image from the plurality of original images, the method further comprises:
obtaining pixel distribution information of each of the plurality of original images, where the pixel distribution information comprising a distribution of pixel points and a plurality of pixel intensities corresponding to the pixel points;
the determining the first reference image from the plurality of original images comprises:

dividing averagely the plurality of image intensities of each of the plurality of original images into a plurality of ranges of intensity;

counting a quantity of pixel points fell in each of the plurality of ranges of intensity;

determining a plurality of pixel distribution maps corresponding to the original images according to the plurality of ranges of intensity of the original images and the quantity of the pixel points fell in each of the plurality of ranges of intensity; each of the plurality of pixel distribution maps corresponding to one of the plurality of original images;

determining the first reference image to be an image corresponding to one of the plurality of pixel distribution maps which is a most standard normal distribution among the plurality of pixel distribution maps.

3. The method according to claim 1, wherein:

the overlapping the plurality of matched images and the first reference image to generate the plurality of overlapping images comprises:

aligning each of the plurality of matched images with the first reference image; and generating the plurality of overlapping images, which are overlapped areas among the aligned plurality of matched images and first reference image.

4. The method according to claim 1, wherein:

before using the synthesized image as the second reference image to perform the image comparison with the test image, to generate the result of defect detection, the method further comprises:

performing a gaussian blur processing on the test image;

the using the synthesized image as the second reference image to perform the image comparison with the test image, to generate the result of defect detection comprises:

using the synthesized image as the second reference image to perform the image comparison with the test image after the Gaussian blur processing is performed, to generate the result of the defect detection.

5. The method according to claim 1, wherein:

the using the synthesized image as the second reference image to perform the image comparison with the test image, to generate the result of defect detection comprises:

generating the result of the defect detection according to a result of a luminance comparison, a result of a contrast comparison, and a result of a structure comparison between the synthesized image and the test image.

6. The method according to claim 1, wherein:

the using the synthesized image as the second reference image to perform the image comparison with the test image, to generate the result of defect detection comprises:

using the synthesized image as the second reference image;

partitioning the second reference image and the test image to generate a plurality of image blocks;

performing the image comparison between each of the plurality of image blocks of the test image and a corresponding of the plurality of image blocks of the second reference image;

determining one of the plurality of image blocks of the test image to be a defect block and remark the defect in the defect block if a result of the image comparison between the one of the plurality of image blocks of the test image and one corresponding of the plurality of image blocks of the second reference image is greater than a preset threshold.

7. A device configured for detecting defects in an image, the device comprising:

a storage device;

at least one processor; and the storage device storing one or more programs, which when executed by the at least one processor, cause the at least one processor to:

obtain a plurality of original images;

select one of the plurality of original images as a first reference image, and serve the plurality of original images without the first reference image as the other images;

match a histogram of each of the other images with a histogram of the first reference image according to the first reference image, to obtain a plurality of matched images;

overlap the plurality of matched images and the first reference image to generate a plurality of overlapping images, each of the plurality of overlapping images comprising a plurality of pixel points;

generate a synthesized image according to pixel intensities of the plurality of overlapping image; and use the synthesized image as a second reference image to perform an image comparison with a test image, to generate a result of defect detection;

wherein further causing the at least one processor to:

for each of the plurality of pixel points in an overlapping image of the plurality of overlapping images, determine a median pixel intensity of a plurality of pixel intensities at a same pixel point of the plurality of overlapping images; and generate the synthesized image according to the median pixel intensity corresponding to each of the plurality of pixel points;

wherein the histogram of each of the plurality of matched images is adjusted based on a degree of similarity between the histogram of each of the other images and the histogram of the first reference image.

8. The device according to claim 7, further causing the at least one processor to:

obtain pixel distribution information of each of the plurality of original images, where the pixel distribution information comprising a distribution of pixel points and a plurality of pixel intensities corresponding to the pixel points;

divide averagely the plurality of image intensities of each of the plurality of original images into a plurality of ranges of intensity;

count a quantity of pixel points fell in each of the plurality of ranges of intensity;

determine a plurality of pixel distribution maps corresponding to the original images according to the plurality of ranges of intensity of the original images and the quantity of the pixel points fell in each of the plurality of ranges of intensity; each of the plurality of pixel distribution maps corresponding to one of the plurality of original images; and determine the first reference image to be an image corresponding to one of the plurality of pixel distribution maps which is a most standard normal distribution among the plurality of pixel distribution maps.

9. The device according to claim 8, further causing the at least one processor to:

align each of the plurality of matched images with the first reference image; and generate the plurality of overlapping images which are overlapped areas among the aligned plurality of matched images and first reference image.

10. The device according to claim 7, further causing the at least one processor to:

perform a gaussian blur processing on the test image; and use the synthesized image as the second reference image to perform the image comparison with the test image after the Gaussian blur processing is performed, to generate the result of the defect detection.

11. The device according to claim 7, further causing the at least one processor to:

generate the result of the defect detection according to a result of a luminance comparison, a result of a contrast comparison, and a result of a structure comparison between the synthesized image and the test image.

12. The device according to claim 7, further causing the at least one processor to:

use the synthesized image as the second reference image;

partition the second reference image and the test image to generate a plurality of image blocks;

perform the image comparison between each of the plurality of image blocks of the test image and a corresponding of the plurality of image blocks of the second reference image;

determine one of the plurality of image blocks of the test image to be a defect block and remark the defect in the defect block if a result of the image comparison between the one of the plurality of image blocks of the test image and one corresponding of the plurality of image blocks of the second reference image is greater than a preset threshold.

13. A non-transitory storage medium storing a set of commands, when the commands being executed by at least one processor of a device for detecting defect in image, causing the at least one processor to:

obtain a plurality of original images;

select one of the plurality of original images as a first reference image, and serve the plurality of original images without the first reference image as the other images;

match a histogram of each of the other images with a histogram of the first reference image according to the first reference image, to obtain a plurality of matched images;

overlap the plurality of matched images and the first reference image to generate a plurality of overlapping images, each of the plurality of overlapping images comprising a plurality of pixel points;

generate a synthesized image according to pixel intensities of the plurality of overlapping image; and use the synthesized image as a second reference image to perform an image comparison with a test image, to generate a result of defect detection;

wherein further causing the at least one processor to:

for each of the plurality of pixel points in an overlapping image of the plurality of overlapping images, determine a median pixel intensity of a plurality of pixel intensities at a same pixel point of the plurality of overlapping images; and generate the synthesized image according to the median pixel intensity corresponding to each of the plurality of pixel points;

wherein the histogram of each of the plurality of matched images is adjusted based on a degree of similarity between the histogram of each of the other images and the histogram of the first reference image.

14. The non-transitory storage medium according to claim 13, further causing the at least one processor to:

obtain pixel distribution information of each of the plurality of original images, where the pixel distribution information comprising a distribution of pixel points and a plurality of pixel intensities corresponding to the pixel points;

divide averagely the plurality of image intensities of each of the plurality of original images into a plurality of ranges of intensity;

count a quantity of pixel points fell in each of the plurality of ranges of intensity;

determine a plurality of pixel distribution maps corresponding to the original images according to the plurality of ranges of intensity of the original images and the quantity of the pixel points fell in each of the plurality of ranges of intensity; each of the plurality of pixel distribution maps corresponding to one of the plurality of original images; and determine the first reference image to be an image corresponding to one of the plurality of pixel distribution maps which is a most standard normal distribution among the plurality of pixel distribution maps.

15. The non-transitory storage medium according to claim 13, further causing the at least one processor to:

align each of the plurality of matched images with the first reference image; and generate the plurality of overlapping images which are overlapped areas among the aligned plurality of matched images and first reference image.

16. The non-transitory storage medium according to claim 13, further causing the at least one processor to:

perform a gaussian blur processing on the test image; and use the synthesized image as the second reference image to perform the image comparison with the test image after the Gaussian blur processing is performed, to generate the result of the defect detection.

17. The non-transitory storage medium according to claim 13, further causing the at least one processor to:

generate the result of the defect detection according to a result of a luminance comparison, a result of a contrast comparison, and a result of a structure comparison between the synthesized image and the test image.

* * * * *